United States Patent [19]

Schepp

[11] 4,382,762
[45] May 10, 1983

[54] THERMOFORMING APPARATUS AND METHOD

[75] Inventor: Frank Schepp, Huntington, Conn.

[73] Assignee: R & G Mold Company Inc., Milford, Conn.

[21] Appl. No.: 312,227

[22] Filed: Oct. 19, 1981

[51] Int. Cl.³ .............................................. B28B 17/00
[52] U.S. Cl. .................... 425/142; 264/40.1;
264/548; 330/6; 425/150; 425/156; 425/302.1
[58] Field of Search ..................... 425/142, 302.1, 150,
425/156; 264/40.1, 548; 330/6

[56] References Cited

U.S. PATENT DOCUMENTS

| Re. 26,413 | 6/1968 | Keyes | 264/89 |
| 3,113,345 | 12/1963 | Butzko | 425/292 |
| 3,166,790 | 1/1965 | Keyes | 425/292 |
| 3,199,630 | 8/1965 | Engel et al. | 330/6 |

Primary Examiner—Maurice J. Welsh
Attorney, Agent, or Firm—Barry R. Lipsitz

[57] ABSTRACT

Thermoforming equipment includes a solid state sensor adapted to determine when a sheet of thermoplastic material has been clamped between a forming mold and a heating platen. Clamping force is provided by a cutter blade carried by said mold around the periphery thereof. Electronic control circuitry responsive to the sensor maintains the thermoplastic sheet in clamped relation without being severed by the blade. After the thermoplastic sheet has been formed into an article defined by the mold, the mold and platen are permitted to continue to close beyond the point sensed by the sensor, permitting the blade to penetrate the sheet and sever the formed article therefrom.

8 Claims, 5 Drawing Figures

THERMOFORMING APPARATUS AND METHOD

BACKGROUND OF THE INVENTION

This invention relates to an apparatus and method for forming three-dimensional articles from thermoplastic sheet material and more particularly, to a thermoforming apparatus wherein a solid state sensor is provided along with electronic circuitry to control the clamping and cutting of thermoplastic material within the apparatus.

Thermoforming apparatus capable of forming thousands of plastic articles by pressure differential and match die forming techniques on a continuous basis are well-known. An example of such forming equipment is illustrated in U.S. Pat. No. 3,113,345, issued Dec. 10, 1963 to Butzko. In this device, a plastic sheet is advanced between a pair of relatively movable platens on a forming press. Heating means on one of the platens softens the web and positive fluid pressure, such as provided by forced air, is exerted through one of the platens to blow the web against the heated area of the other platen. Once the web has been softened, the air flow is reversed and the heated portion of the web is drawn by a vacuum into a mold cavity in the unheated platen and conforms closely to the walls thereof. Positive fluid pressure, such as provided by forced air, can be exerted through the opposite, heated platen, to aid in forming the web and conforming it to the mold cavity in the opposite platen. The relatively cold surface of the mold cavity cools the formed article.

Cutting means such as a peripheral knife is also provided on one of the platens. Initially, the knife clamps the web to the heated platen when the platens move downwardly relative to one another. Once the softened web is formed by drawing it into one of the mold cavities by the pressure differential technique referred to above, slight movement is given to the knife bearing platen to completely extend it and have it either cut completely through or score the periphery of the formed article in the thermoplastic sheet.

The prior art has used various mechanical methods for clamping the thermoplastic sheet and for severing the formed article from the sheet following the forming operation. Butzko accomplishes these two steps through the use of purely hydraulic and mechanical means. Air cylinders and plungers are used to provide means for limiting the closed relation of the platens to a point at which the thermoplastic sheet is clamped-therebetween without full penetration of the sheet by the peripheral knife. Additional hydraulic means are provided for rendering the limit means inoperative, permitting full closing movement of the platens and full penetration of the sheet by the knife. A timer controlled valve means is provided for establishing the proper timing of these steps during the dynamic operation of the apparatus.

Another method for providing the two stage closing motion of the platens is disclosed in U.S. Pat. No. Re. 26,413 to Keyes. This patent teaches the actuation of two air cylinders successively, to close the press in two stages. U.S. Pat. No. 3,166,790 also to Keyes shows the identical two cylinder press closing means.

The prior art thermoforming presses rely on strictly mechanical means for providing the two stage clamping and scoring/severing functions described above. Such mechanical systems require a relatively lengthy set-up time in order to properly adjust the point at which the blade will be stopped in clamped relation with the thermoplastic sheet. Different thicknesses of thermoplastic material will require varying extensions of the platens and blade in order to secure the proper clamping function.

In addition to the set-up time, it has been found that the prior art mechanically operated machines must be readjusted periodically throughout the day in order to continue proper operation.

These and related problems have been solved by the present invention which uses solid state sensing techniques and an electronically controlled clamping and severing apparatus in conjunction with an otherwise substantially conventional thermoforming apparatus.

SUMMARY OF THE INVENTION

In accordance with the present invention, a thermoforming apparatus utilizing pressure differential forming equipment is provided with a solid state sensor for sensing when the closed relation of the forming mold and heating platen is such that a thermoplastic sheet is clamped between the platen and a cutter blade mounted on the forming mold without the sheet being severed. Electronic control means responsive to the sensor is provided for causing the closed relation sensed by the sensor to be maintained during the formation of an article in the thermoforming apparatus. Sensor override means is provided for causing the mold and platen to close beyond the point sensed by the sensor, permitting the cutter blade to penetrate the thermoplastic sheet along the perimeter of the article formed therein.

By virtue of the electronic sensing and control means disclosed, the set-up time of the thermoforming apparatus is significantly reduced since precise control of the clamping action is provided. The need to readjust the thermoforming apparatus during its use is eliminated due to the stability and reliability of the sensing mechanism. Further, maintenance on the thermoforming apparatus is simplified as a result of the elimination of a number of mechanical components. Additionally, it has been found that the throughput of a conventional thermoforming apparatus, modified in accordance with the present invention, is increased on the order of 75% to 100%.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
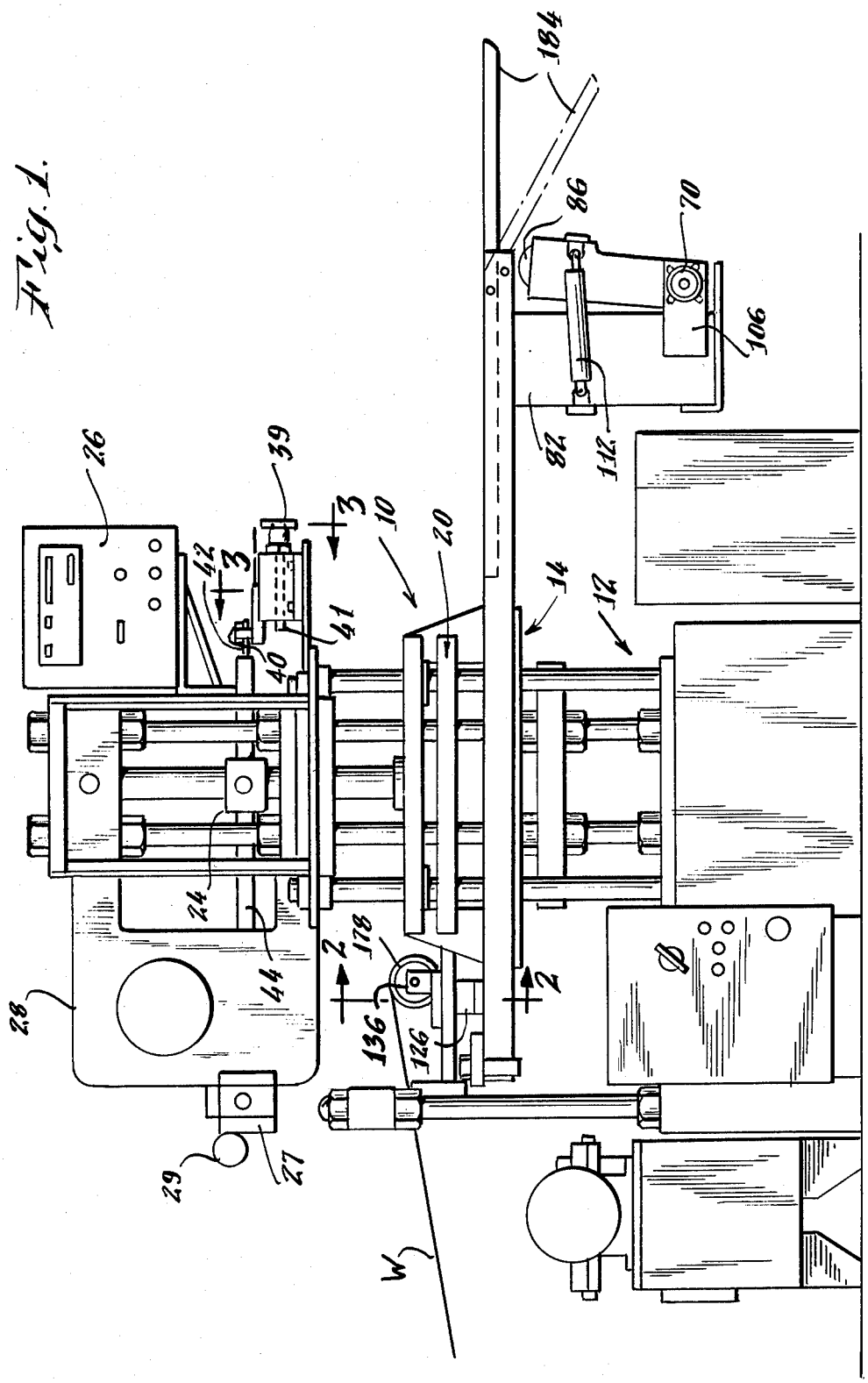
FIG. 1 is a side view in elevation of the thermoforming apparatus of the present invention.

Referring now to the drawings in detail, wherein like numerals indicate like elements throughout the several views, the thermoforming apparatus of the present invention is shown in FIG. 1 and designated by the numeral 10.

The apparatus 10 includes means for advancing a plastic web W intermittently through a forming press 12, wherein a plurality of three-dimensional articles are formed in the web W. The press 12 is, with the exception of the solid state sensing means to be described hereinafter, well-known in the art. The forming dies of the forming press 12 are illustrated in detail in FIG. 2.

Forming press 10 includes a lower heater platen 14 and an upper mold platen 20. Platen 20 is adapted to be moved vertically relative to the lower heater platen 14 in a well-known manner, as for example, by the elongation or retraction of a piston 44 of a hydraulic cylinder 27 mounted on the frame 28 of press 10. The piston 44 is connected to a toggle linkage 24. Upon retraction or extension of piston 44, the toggle linkage 24 will move the upper or mold platen 20 relative to the lower stationary heater platen 14. Toggle linkage arrangement 24 is well-known in the art and is illustrated in U.S. Pat. No. 3,113,345 issued Dec. 10, 1963 to Butzko; U.S. Pat. No. 2,166,790 issued Jan. 26, 1965 to Keyes; or U.S. Pat. No. Re. 26,413 to Keyes issued June 25, 1968. The mechanism disclosed in these patents to move the upper platen relative to the lower platen is incorporated herein by reference.

Figure 2:
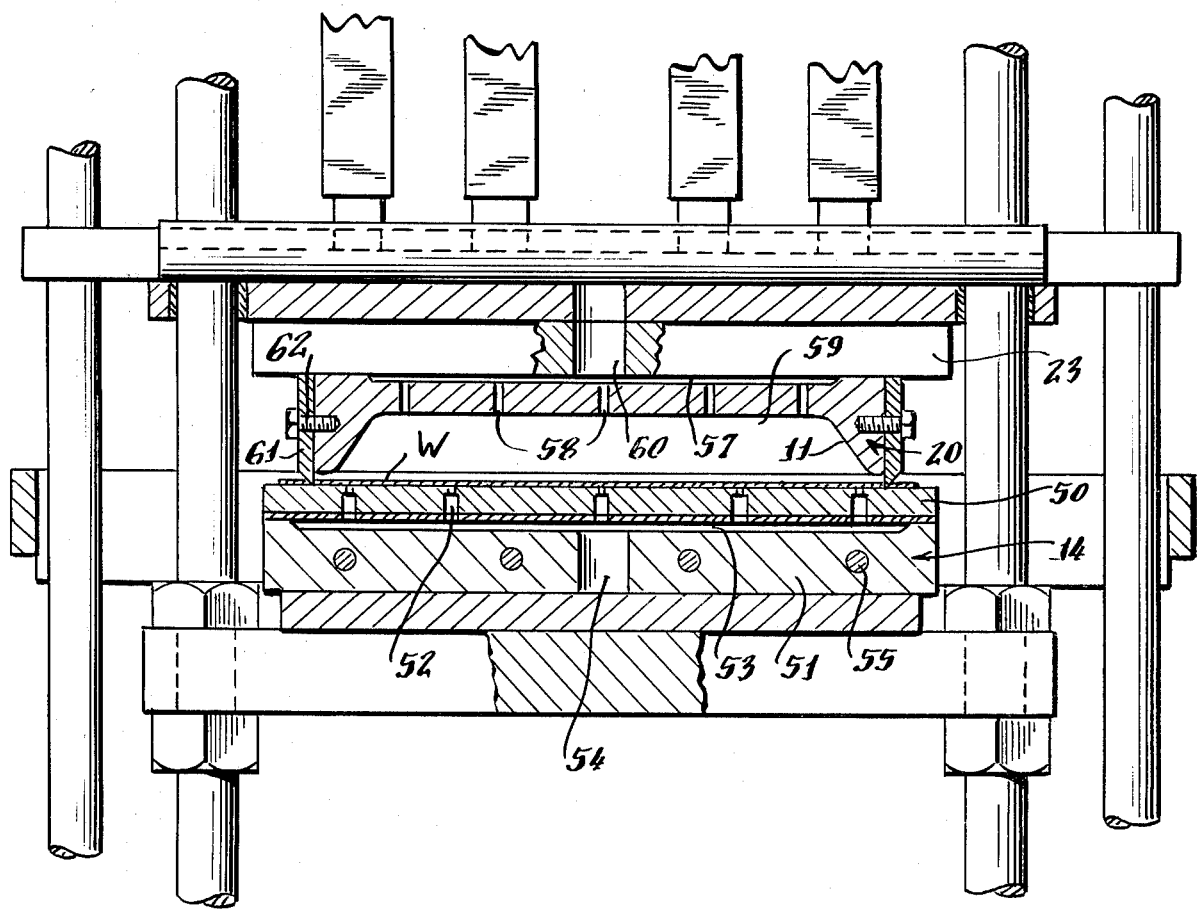
FIG. 2 is a cross-sectional view taken substantially along the plane indicated by line 2—2 of FIG. 1 and illustrates a portion of the forming press utilized in the thermoforming apparatus of the present invention.

The lower heater platen 14 comprises a body member 51, shown in FIG. 2, having at an upper surface a heater plate 50, the planar face surface of which is in communication through substantially equally distributed spaced passages 52 of relatively small diameter, with a manifold channel 53 in the body member having an orifice 54 connected with a source of vacuum and/or pressurized air, the selective control of vacuum or pressure being provided by suitable timer-actuated valve means (not shown) controlled by an electronic control apparatus 26 in a well-known manner. Control apparatus 26 is of the type manufactured by Jensel Manufacturing Company of Wolcott, Conn., under the designation "Cam 1". The heater platen 14 is heated in a well-known manner by electrically conductive rods 55 suitably distributed in the body member 51 to which electrical current is supplied through a flexible cable connection (not shown).

The upper platen 20 includes a cavity mold 11 provided with a cavity 57 or suitable shape to produce the desired article, and is in communication through suitably disposed passages 58 with a manifold chamber 59 in a supporting plate 23 which in turn is in communication through an orifice 60 with a source of vacuum and/or pressurized air which is selectively controlled in a well-known manner by timer-actuated valve means operated by control apparatus 26.

Connected to the periphery of the cavity mold 11 and corresponding in shape to the outer edge of the article to be formed is a cutter blade member 61, shown in the illustrated example as a circular band secured to the plate 23. This blade is adapted, as will be presently made more fully apparent, to sever a formed article from the plastic sheet W and for this purpose, the projection of its severing edge below the lower side of the rim surrounding the cavity 57 corresponds substantially to the thickness of the sheet W.

In the operation of the forming press 12, the plastic sheet W is first drawn forwardly beneath the cavity mold 11 where it rests upon the heater plate 50 and is clamped thereto by the projecting portion of the cutter blade 61, which is caused by the press to partially penetrate or indent the sheet W. The mechanism which causes the upper platen 20 and hence the cutter blade 61 to stop before sheet W is actually severed by cutter blade 61 will now be described.

Piston 44 has operatively associated therewith an actuating member 42. Member 42 cooperates with solid state sensor 40 to determine when upper platen 20 has been moved by piston 44 and toggle linkage 24 to a desired location. The lateral position of solid state sensor 40 is adjustable by turning threaded shaft 41 in or out, depending on the direction in which it is desired to adjust sensor 40. Threaded shaft 41 is turned by means of knob 39. By so adjusting sensor 40, the detected position of upper platen 20 and hence, cutter blade 61, with respect to heating platen 14 can be altered.

In a preferred embodiment, solid state sensor 40 is a type of sensor known to those skilled in the art as a Hall effect sensor. These sensors work on a phenomenon known as the "Hall effect" which stands for the principle that when a conductor through which current is flowing is placed in a magnetic field, a difference in potential (Hall voltage) is generated between the two opposed edges of the conductor in the direction perpendicular to both the field and the current. A typical Hall effect sensor which may be used in the present invention is designated as Model 4AV2C and manufactured by the MICRO SWITCH division of Honeywell, located in Freeport, Ill.

The model 4AV2C Hall effect sensor is a type known as a vane sensor. Vane sensors respond to the interruption of a magnetic field, and are operated by the magnetic flux from a permanent magnet (or, in some cases, an electromagnet). The sensing element is a Hall sensor with a trigger and amplifier integrated on a silicon chip. When a magnet is placed so that its field is at a right angle to one face of the sensor (through which a small current is flowing), a small voltage appears at the opposite edges. The trigger and amplifier convert this voltage into a usable digital output.

Figure 4:
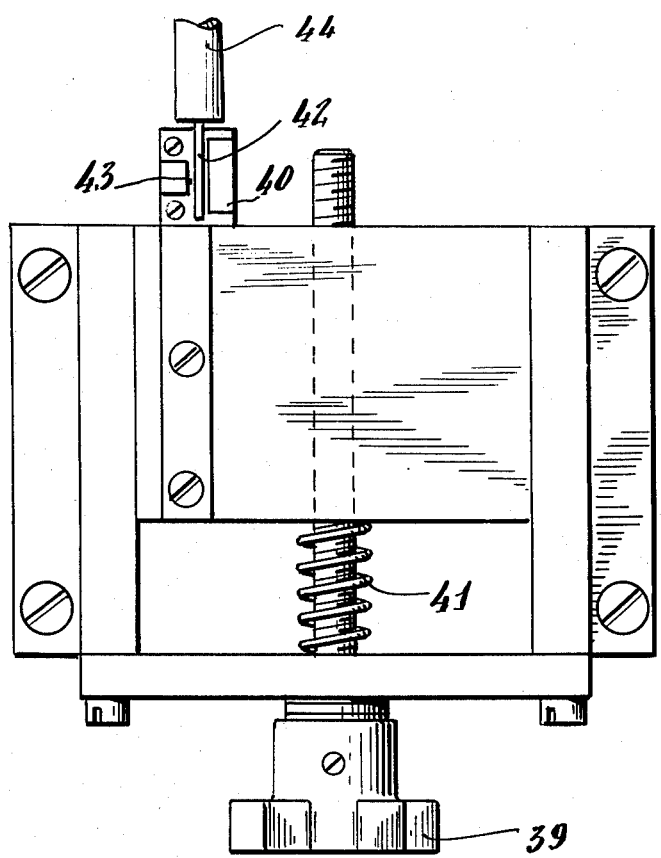
FIG. 4 is a top plan view of the solid state sensor and actuator assembly shown in FIG. 3.
Figure 3:
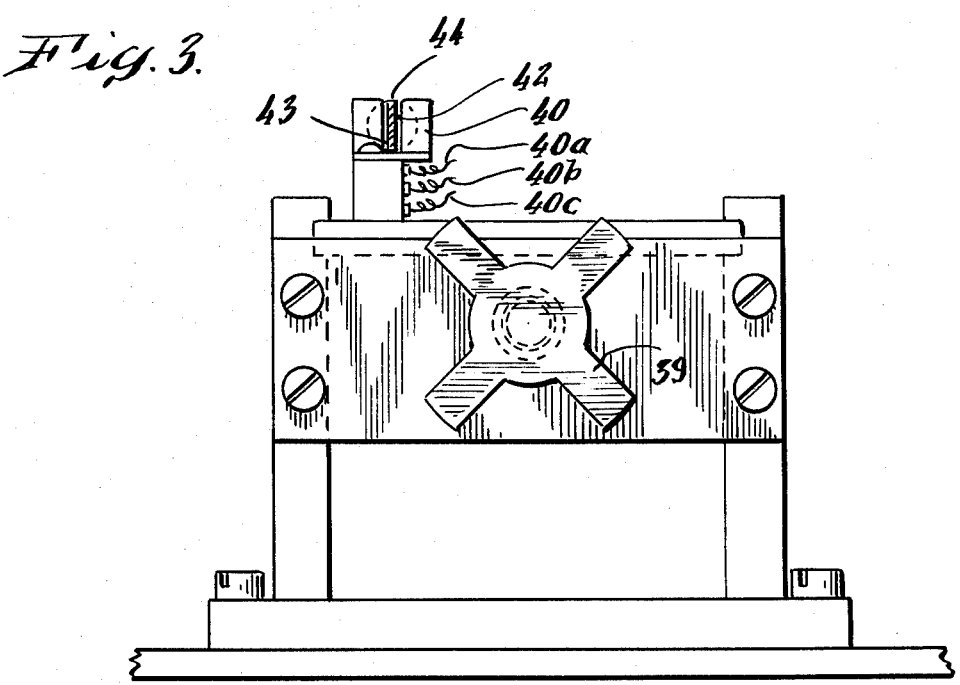
FIG. 3 is a cross-sectional view taken substantially along the plane indicated by line 3—3 of FIG. 1 and illustrates a portion of the solid state sensor and actuator assembly utilized in the thermoforming apparatus of the present invention.

As shown in FIGS. 3 and 4, Hall effect sensor has a gap 43 into which actuator member 42 can protrude. Actuator 42 is composed of a ferrous material which when passed through gap 43, interrupts ("shunts") the magnetic field from the magnet (on one side of gap 43) away from the sensor (on the other side of gap 43). When actuator 42 enters gap 43 of Hall effect sensor 40, the output of the sensor is activated to control (e.g. turn-off) a load connected thereto. Terminals 40a, 40b, and 40c are used to make electrical connections to the Hall effect sensor 40.

Figure 5:
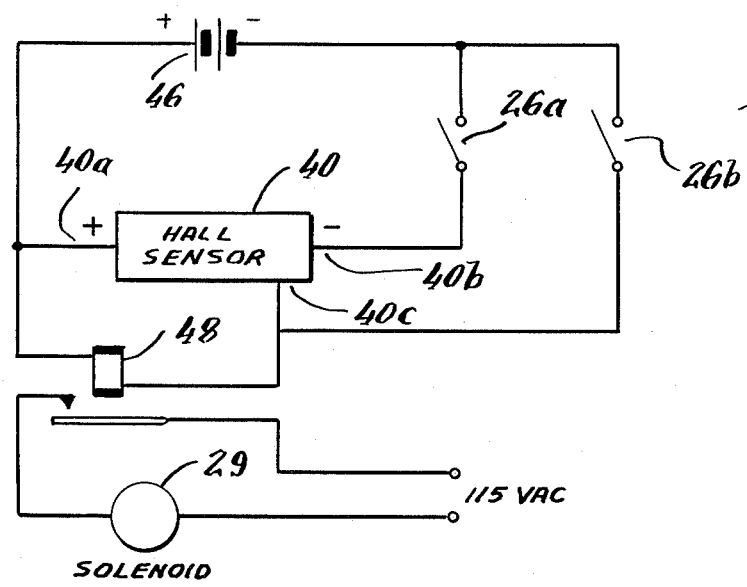
FIG. 5 is a schematic diagram of a portion of the control circuitry used in conjunction with the solid state sensor and actuator assembly of the present invention.

FIG. 5 is a schematic diagram showing a portion of the control circuitry which may be used in accordance with the present invention. Hall effect sensor 40 is connected at positive terminal 40a to the positive terminal of a DC power source 46. Terminal 40b of Hall effect sensor 40 is connected through switch 26a of the negative terminal of DC power source 46. Switch 26a is one of a plurality of switches internal to, and controlled by control apparatus 26. Switch 26b is another switch internal to control apparatus 26 and when closed, connects the negative terminal of DC supply 46 to the coil of relay 48. Terminal 40c of Hall effect sensor 40 is connected to one end of the coil of relay 48. The other end of this coil is connected to the positive terminal of DC supply 46. Relay 48 includes a normally open switch which closes when the relay coil is energized. The closing of the switch in relay 48 energizes solenoid 29 through the 115 volt AC power source connected as shown. As shown in FIG. 1, solenoid 29 controls the hydraulic cylinder 27 and hence piston 44.

In operation, when plastic sheet W is in position beneath the cavity mold 11, upper platen 20 and cutter blade 61 are caused to move downwardly under the control of solenoid 29 and hydraulic cylinder 27. Such downward movement occurs when relay 48 is energized, through the normally closed terminals 40b and 40c of Hall effect sensor 40, by the closing of switch 26a. As already noted, energizing relay 48 causes solenoid 29 to turn on. Downward movement of upper platen 20 results from piston 44 moving toward the right end of thermoforming apparatus 10 and driving toggle linkage 24. At the same time, actuator member 42, operatively associated with piston 44, moves toward the right and eventually enters slot 43 in solid state sensor 40. When this happens, solid state sensor 40 detects the presence of actuator member 42 and immediately opens the circuit between its terminals 40b and 40c, deenergizing relay 48 and solenoid 29. Thus, when actuating member 42 is detected by sensor 40, hydraulic cylinder 27, which is controlled by solenoid 29, will stop moving piston 44 rightwardly and the downward movement of upper platen 20 will cease.

Adjustment of sensor 40 relative to actuator member 42 can be made to provide control of the point at which upper platen 20 will stop moving downwardly. Thus, the precise clamping action of plastic sheet W between cutter blade 61 and heater plate 50 is easily controlled by adjusting the position of solid state sensor 40. Alternatively, actuator member 42 could be adjusted to provide such control.

When clamped against heater plate 50, the sheet is maintained in flat contact therewith either by applying vacuum at the lower side or pressure at the upper side, or a combination of vacuum and pressure at the upper and lower sides through the various manifolds 53 to 59 respectively.

As soon as the thermoplastic sheet W becomes heated to the desired molding temperature, the control apparatus 26, which is set to the predetermined heating time, actuates the timed valve means to reverse the pressure upon the sheet W to cause it to be moved through deformation into conforming relation with the cavity 57 of cavity mold 11 in the upper platen 20. Such movement may be produced either by pressure at the lower side or vacuum at the upper side of sheet W, or a combination of pressure and vacuum. During this forming operation, the edges of sheet W are securely clamped and sealed, at the point marking the outer periphery of the formed article by the partial penetration of the blade member 61. When the articles are formed and set through contact with the relatively cool cavity mold 11, they are severed from the sheet W by means of extending blade member 61 to fully penetrate the sheet W and seat against the heater platen 50. This is accomplished by electronic control apparatus 26 causing switch 26b to close. Closing switch 26b energizes relay 48 and solenoid 29 so that cylinder 27 drives piston 44 to fully extend toggle linkage 24. In its operation, electronic control apparatus 26 utilizes a timer to determine when to close switch 26b. Typically, the timer will start counting when sensor 40 determines that sheet W has been properly clamped to heater platen 50. During the time period provided by the timer, the molding process and formation of an article from sheet W will be completed.

The extension of blade member 61 serves to sever the molded article from sheet W. At the completion of this step, the upper mold platen 20 is raised and the formed article may be subjected to positive air pressure above it to assist in its removal from the mold cavity 57.

Upon raising of the platen 20 of the forming press 12, the plastic web or sheet W is intermittently advanced to present an upstream portion of the web W between the platens 14 and 20 and to remove the formed articles from the web matrix.

It will now be appreciated that the present invention provides electronic means for sensing and adjusting the relative positions of an upper and lower platen on a thermoforming apparatus. Thermoforming apparatus constructed in accordance with the present invention is vastly improved over prior art devices. In particular, set-up time (e.g. adjustment of the apparatus for various thickness thermoplastic sheets) is greatly reduced. The need to readjust the apparatus throughout the course of production is virtually eliminated. Machine throughput is greatly increased due, in part, to the almost instantaneous (approx. 1 nanosecond) response time of the Hall effect sensor used in the preferred embodiment.

I claim:

1. In an apparatus for forming thermoplastic sheet material comprising a forming mold, a heater platen, cutter blade means carried by said mold having a continuous outline shape defining the peripheral outline of the article to be formed therein, drive means for bringing said mold and platen into and out of closed relation with a thermoplastic sheet between them, said thermoplastic sheet spanning the cutter blade means and having a margin entirely surrounding said cutter blade means, and means for applying differential air pressures to said sheet to successively hold it in contact with said heater platen and to form it in a heated plastic state into conformity with said mold, the improvement comprising:

solid state sensor means for sensing when the closed relation of said mold and platen is such that said thermoplastic sheet is clamped between said platen and said blade means without full penetration of said sheet by said blade means, electronic control means responsive to said sensor means for causing the closed relation sensed by said sensor means to be maintained during the formation of an article, and sensor override means for causing said mold and platen to close beyond the point sensed by said sensor means, permitting said blade means to fully penetrate said sheet along the perimeter of the article formed therein.

2. The apparatus of claim 1 wherein said electronic control means and said sensor override means are operatively associated with said drive means.

3. The apparatus of claim 1 further comprising timer means for inhibiting said sensor override means from operating until a predetermined period of time after said sensor means has sensed said closed relation.

4. The apparatus of claim 1 or 3 wherein said solid state sensor means is a Hall effect sensor.

5. The apparatus of claim 1 wherein said heater platen is stationary and said forming mold is movable with respect to said heater platen, said solid state sensor means detecting when said forming mold has reached a predetermined position.

6. The apparatus of claim 5 wherein said solid state sensor means is a Hall effect sensor and further comprising Hall effect sensor actuating means adapted to move in conjunction with said forming mold.

7. The apparatus of claim 1 or 6 further comprising means for adjusting the position of said solid state sensor means to set the point at which said closed relation will be maintained.

8. The apparatus of claim 6 further comprising means for adjusting the position of said actuating means to set the point at which said closed relation will be maintained.

* * * * *